United States Patent [19]

Rollin

[11] Patent Number: 5,202,792
[45] Date of Patent: Apr. 13, 1993

[54] SYSTEMS OF OBJECTIVES WITH OPTICAL ATHERMALIZATION

[75] Inventor: Joël Rollin, Vanves, France

[73] Assignee: Thomson TRT Defense, Guyancourt, France

[21] Appl. No.: 770,411

[22] Filed: Oct. 3, 1991

[30] Foreign Application Priority Data

Oct. 9, 1990 [FR] France .................. 90 12444

[51] Int. Cl.⁵ .................. G02B 9/10; G02B 13/14
[52] U.S. Cl. .................. 359/356; 359/357; 359/795
[58] Field of Search ............... 359/355, 356, 357, 646, 359/795

[56] References Cited

U.S. PATENT DOCUMENTS

| | | | |
|---|---|---|---|
| 4,398,786 | 8/1983 | Neil | 359/356 |
| 4,486,069 | 12/1984 | Neil et al. | 359/356 |
| 4,494,819 | 1/1985 | Lidwell | 359/356 |
| 4,505,535 | 3/1985 | Neil | 359/357 |
| 4,679,891 | 7/1987 | Roberts | 359/357 |
| 4,834,472 | 5/1989 | Palmer | 359/356 |

FOREIGN PATENT DOCUMENTS

| | | |
|---|---|---|
| 0171903 | 2/1986 | European Pat. Off. . |
| 0367197 | 5/1990 | European Pat. Off. . |
| 2071353 | 9/1981 | United Kingdom . |
| 2121211 | 12/1983 | United Kingdom . |
| 2161616 | 1/1986 | United Kingdom ......... 359/356 |

Primary Examiner—Martin Lerner
Attorney, Agent, or Firm—Oblon, Spivak, McClelland, Maier & Neustadt

[57] ABSTRACT

An infrared objective device with optical achromatization and athermalization comprises a front convergent assembly having at least one divergent lens acting as a port and one convergent lens, and a rear divergent assembly comprising at least one divergent lens. These three lenses are chosen so as to be made of three different materials of the type that can be used in the 8 to 12 $\mu m$ spectral band. They may notably be made, respectively, of germanium, chalcogenide and zinc sulphide.

12 Claims, 3 Drawing Sheets

A: ZnS – ZnSe – Ge
B: ZnS – Amtir – Ge
C: Ge – ZnSe – ZnS
D: Ge – Amtir – ZnS

SYSTEMS OF OBJECTIVES WITH OPTICAL ATHERMALIZATION

BACKGROUND OF THE INVENTION

1. Field of the Invention

The present invention relates to infrared objective systems with optical athermalization and achromatization.

2. Description of the Related Prior Art

The principle of passive athermalization has already been the subject of many publications and patents.

Thus, an optical configuration of the dyalite type with two convergent sets arranged to form an achromatic system has been described in patent application GBA-A-2 121 211, the optical configuration compensating for the variations in optical distance between rear lens and focal plane induced by the expansion of the support and the changes in the indices of the glasses with the temperature. It has an approximately achromatic assembly of two lenses and a rear assembly constituted by a doublet, a convergent lens made of $As_2Se_3$ and a divergent lens made of germanium, which undergoes great variations in focal length variations with temperature.

There also exist known systems with different architectures, as described, for example, in patent application No. GB-A-2 161 616, the basic element of which is constituted by a bonded triplet, of which the first two lenses, one positively powered front lens made of zinc selenide or chalcogenide and one divergent lens made of zinc sulphide, provide achromatization while the rear divergent lens, made of germanium, enables athermalization to be achieved. However, in all prior art objective systems, the variations of the focal lengths and the sensitivities to thermal gradients are not adequately corrected.

There have also been proposed systems of objectives with mirrors. These systems are generally less sensitive to thermal fluctuations. However, such systems are rarely used because, firstly, they do not allow a sufficient field to be obtained and, secondly, they often contribute a central concealment, and thus entail mirror dimensions that are incompatible with the space factor constraints.

It is clear, from the foregoing, that dioptric configurations will therefore be preferred. However, most of the architectures proposed prove to be highly sensitive to thermal drifts when germanium is used for the manufacture of the lenses and when it is desired to make relatively long focal lengths for objectives.

SUMMARY OF THE INVENTION

An object of the present invention is the making of an infrared objective system, the front lens of which can act as a front port.

Another object of the invention is the making of an infrared objective device, the different lens elements of which are manufactured from materials in the 8 $\mu$m–12 $\mu$m spectral band.

Yet another object of the invention is the making of an infrared objective device having a relative insensitivity to thermal gradients.

Yet another object of the present invention is the making of an infrared objective device for which the variations in focal lengths with temperature are minimized, so that the field of this objective system does not change with temperature.

An object of the present invention, therefore, is an infrared objective device with passive optical achromatization and athermalization resulting from the structure of the device, said device comprising at least one convergent assembly cooperating with at least one divergent assembly, these assemblies being aligned on one and the same optical axis, wherein the convergent assembly is constituted by at least one convergent lens associated with at least one divergent lens and wherein the divergent assembly is constituted by at least one divergent lens, all the constituent materials of these lenses being chosen from among those that can be used in the 8 $\mu$m to 12 $\mu$m spectral band. According to an essential characteristic of the invention, each lens of the infrared device is made of a material different from the one constituting each adjacent lens.

In the device of the invention, the front lens is designed to replace the standard exit port of the infrared system and is constituted by a material, for example germanium, having the appropriate physical characteristics and characteristics of resistance to chemicals and atmospheric influences.

According to a first embodiment of the infrared objective device according to the invention, the first convergent assembly is constituted by a divergent lens made of a chosen material, germanium or zinc sulphide, and a convergent lens made of chalcogenide (Amtir).

According to one embodiment, a divergent rear set made of zinc sulphide is associated with a convergent front lens made of germanium.

The rear set therefore includes at least one lens made of zinc sulphide if germanium is used in the front set.

DESCRIPTION OF THE PREFERRED EMBODIMENTS

Figures 1, 2, 3:
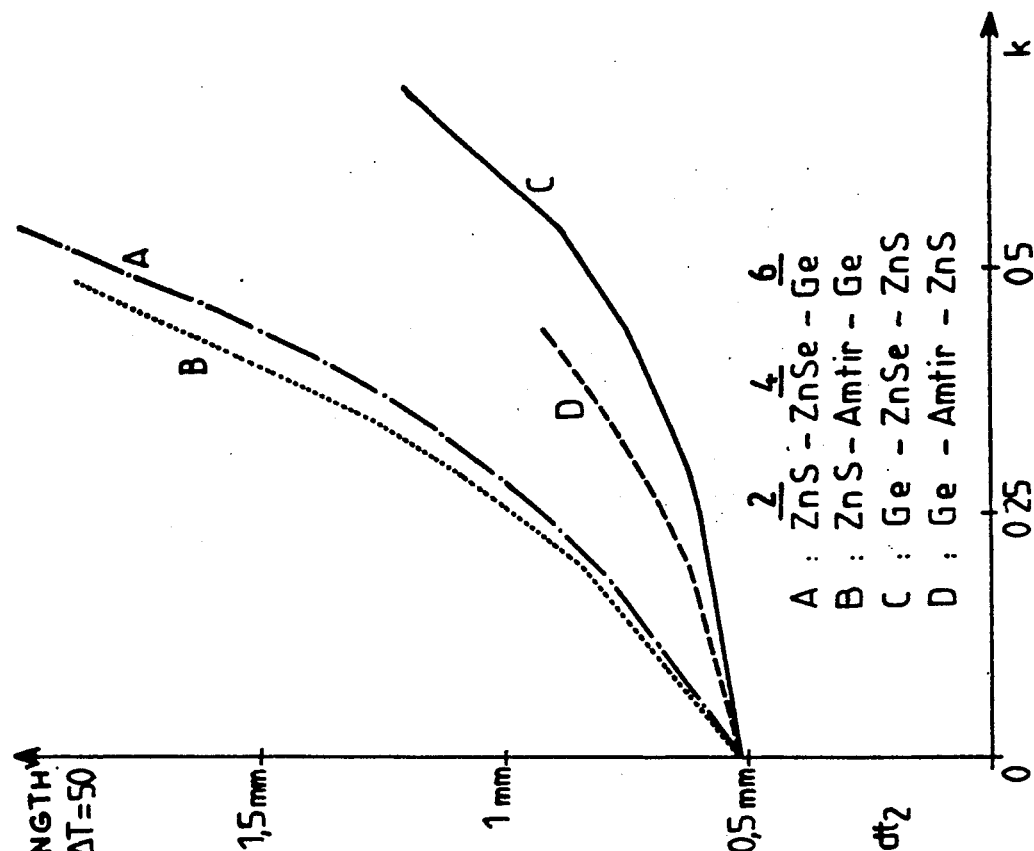
FIGS. 1 and 2 illustrate arrangements of lenses according to the present invention.
FIG. 3 illustrates different curves representing the thermal variations of focal lengths for different arrangements of lenses.

Before making a more detailed description of the different forms and embodiments of the present invention, it would be appropriate to list the chief causes of thermal modifications in an optical assembly. These are:

the variations in the indices of the materials with temperature, with a magnitude greater than that of the variations for the glasses used for the visible wavelengths;

the mechanical expansion of the supports or optical elements;

the phenomena of strain in the lenses under temperature; this effect may, however, be eliminated by an appropriate mechanical assembly.

Table 1 here below gives details of the thermal and spectral characteristics of the four infrared materials commonly used in the 8-12 μm spectral band: it is seen that the index of germanium, which is the glass most frequently used because of low chromatic dispersion and its high refraction index, undergoes very high variations with temperature. This table specifies the spectral characteristics of these glasses, the knowledge of which conditions the setting up of an optical assembly with the requisite characteristics.

TABLE 1

| Material | Thermal and Spectral Characteristics | | | |
| --- | --- | --- | --- | --- |
|  | ZnS | ZnSr | Ge | Amtir |
| Variation in index | $4.33.10^{-5}$ | $6.00.10^{-6}$ | $3.96.10^{-4}$ | $8.50.10^{-5}$ |
| Coefficient of expansion α | $7.85.10^{-6}$ | $7.57.10^{-6}$ | $6.10.10^{-6}$ | $12.8.10^{-6}$ |
| Index n | 2.20 | 2.40 | 4.00 | 2.49 |
| Abbe number (8-12 μm) | 22.8 | 58.1 | 1112.29 | 112.98 |

Besides, with respect to the thermal defocussing, it must be specified that, for a non-athermalized objective, the focusing plane varies with the temperature. The drop in quality is perceptible once the defocusing goes beyond the field depth of the camera, this field depth being defined by the aperture of the system and the size of the detector or of its image in the focal plane of the objective if a scanning module accompanies the device. In the case of the objectives with the thermal modular scanning system, which have an aperture of F/4.1, the image of the detector in this focal plane has dimensions of 90 μm for example. It can then be shown that a defocusing of the order of 280 μm produces a drop of 10% in the modulation transfer function, which is a function of quality: this has little effect on the quality of the image. The objective may thus considered to be athermalized in terms of distance between rear lens and focal plane provided that the defocusing at the extreme temperatures of operation does not go beyond this value.

With respect to the variations in the focal length with temperature, it should noted that an objective may very well be athermalized in terms of distance between rear lens and focal plane without its focal length remaining constant in temperature. Let us assume, in an example more especially related to military applications, that a firing control system is associated with the camera. The observer shifts a reticle on the target identified and electronic processing system then responds by sending this shift instruction to the firing system which manages, for example, the sight values of the gun. If the objective is not athermalized in focal length, the apparent field aimed at by the reticle drifts under temperature in such a way that, if the processing does not take account of this error, the firing precision diminishes as and when the temperature deviates from the nominal temperature. When there is no distortion, a shift of the reticle to get a fix on a sighting direction $\theta$ will be given by the relationship:

$$yo = fo \cdot \tan \theta$$

If the focal length changes with the temperature, for a shift yo of the reticle, an error of appreciation $\delta\theta$ of the sighting direction $\theta o$ is committed:

$$\delta\theta = -\frac{\Delta f}{fo} \sin\theta o \cos\theta o$$

-continued $$R'_1 = R_1(1 + \alpha\Delta T)$$
$$R'_2 = R_2(1 + \alpha\Delta T)$$

For example, a relative focal length variation of 2% for an objective with a 5° field leads to an aiming error of the order of one meter to one kilometer at the edge of the diagonal field: this error is naturally added to the mechanical uncertainties.

Conventionally, for a thin lens with a refractive index n, the focal distance f is expressed as a function of the radii R1 and R2 of the surfaces that limit it by the relationship:

$$\frac{1}{f} = (n - 1)\left(\frac{1}{R_1} - \frac{1}{R_2}\right)$$

In the presence of a temperature change $\Delta T$: the index n and the radii $R_1$ and $R_2$ become n', $R'_1$ and $R'_2$ such that:

$$n' = n + \frac{dn}{dt} \Delta T$$

$$R'_1 = R_1(1 + \alpha\Delta T)$$

$$R'_2 = R_2(1 + \alpha\Delta T)$$

Giving a relative focal length variation of:

$$-\frac{\Delta f}{f} = \frac{\Delta T}{\eta} \text{ with } \eta = \frac{1}{\left[\frac{\delta n/\delta T}{(n-1)} - \alpha\right]}$$

It is thus possible to define an Abbe pseudo-number $n_r$ characterizing the thermal drifts of a thin lens.

Thus, for the four materials referred to here above:

| Material | Zn S | Zn Se | Ge | Amtir |
| --- | --- | --- | --- | --- |
| η | 35 419 | 28 339 | 7 943 | 22 600 |

Objectives with three lenses have been shown in FIGS. 1 and 2 appended hereto. They have a convergent doublet in front constituted by two lenses 2 and 4, respectively divergent and convergent, and a divergent lens 6 in the rear. This is a configuration of the telescope objective type, having a distance d between the front and rear lens assemblies, a distance T between the rear lens and the focal plane in which an IR detector D is placed, a focal length FL for the objective, focal lengths fa and fb respectively for the constituent lenses 2 and 4 of the doublet giving rise to a convergent front focal length f1 and a focal length fc for the rear divergent lens 6. Let $k=d/f_1$ and, evidently, $$k = 1 - \frac{T}{F} \text{ (T distance between rear lens and focal plane)}$$

T and F are given values fixed by the space factor constraints.

It is then possible, since k is thus given, to compute the respective focal lengths of the lenses 2, 4 and 6, fa, fb, fc to fulfil the requisite conditions, namely the achromatization on the axis, the obtaining of the focal length and the athermalization of the objective.

With respect to the conditions of achromatization, the following facts must be specified:

If $\delta a$, $\delta b$ respectively designate the Abbe numbers of the lenses 2, 4 and 6, the achromatization condition becomes:

$$\frac{1}{fa\,\delta a} + \frac{1}{fb\,\delta b} + \frac{(1-k)^2}{fc\,\delta c} = 0 \qquad [P_1]$$

Value of the focal length $$\text{Gullstrand's formula:}\ \frac{1}{fa} + \frac{1}{fb} + \frac{(1-k)}{fc} = \frac{1}{F} \qquad [P_2]$$

With respect to the condition of athermalization, it will be noted that:

$\eta a$, $\eta b$, $\eta c$ correspond to the thermal Abbe pseudo-numbers defined here above for the three lenses 2, 4, 6:

$\alpha$ is the expansion coefficient of the aluminium ($0.24 \cdot 10^{-4}$) or stainless steel ($0.125 \cdot 10^{-4}$) support.

Computation shows that, to compensate for the expansion of the supporting spacers, the focal lengths fa, fb, fc should comply with the relationship:

$$\frac{1}{fa}\left(\frac{1}{\eta a} + k\alpha\right) + \frac{1}{fb}\left(\frac{1}{\eta b} + k\alpha\right) + \frac{(1-k)^2}{fc\,\eta c} = -\alpha\frac{(1-k)^2}{T} \qquad [P_3]$$

When the corrective terms associated with the expansion of the mechanical supports become negligible, relationship $P_3$ becomes quite identical to the condition of achromatization $P_1$.

The focal lengths fa, fb and fc are therefore entirely determined by this system of three equations with three unknowns.

With respect to the minimizing of the variations in focal length, computation shows that the the focal length F does not change with temperature if fa, fb and fc verify the equation $P_4$:

$$\frac{1}{fa\,\eta a} + \frac{1}{fb\,\eta b} + \frac{(1-k)}{fc}\left(\frac{1}{\eta c} + \alpha\right) = 0 \qquad [P_4]$$

A condition such as this is generally incompatible with the preceding ones, and one problem lies in the choosing of the sequence of glasses constituting the lenses 2, 4, 6 so as to minimize $P_4$.

Thus, FIG. 1 shows the optimum configuration from this viewpoint, as a function of the parameter k.

According to the invention, the front port of a standard telescope objective device is therefore replaced by a convergent assembly having a front lens made of germanium. This results in a transmission gain, but it is necessary to resolve the problem of thermal gradient which arises inevitably, since the front set of lenses is normally at a temperature that is slightly different from that of the rear divergent lens, so much so that the system is not quite athermalized.

Assuming that, as shown in FIG. 2, the front assembly 2, 3 undergoes a temperature variation $dt_1$ while the rear lens 6 and the interface with the detector D, placed in the focal plane, move away from the reference-temperature of $dt_2$, computation shows that, while the temperature gradient remains linear between the front set and the rear lens, a rear shim gets expanded by a value:

$$d\alpha\frac{[dt_1 + dt_2]}{2}$$

The expression ($P_5$) that follows then expresses the first order defocusing $\epsilon$, for a self-athermalized objective, undergoing a temperature gradient:

$$\epsilon = \frac{T^2}{(1-k)^2}(dt_2 - dt_1)\left[\frac{1}{fa\cdot\eta a} + \frac{1}{fb\cdot\eta b} + \frac{k\alpha}{2}\left(\frac{1}{fa} + \frac{1}{fb}\right)\right] \qquad [P_5]$$

The optical configuration will be all the less sensitive to the gradients as the quantity P5 will have been minimized.

Referring now to the appended drawings, FIG. 3 shows four layers A, B, C, D which correspond to the variations in focal length for a temperature variation $\Delta T = 50°$ C., for four different configurations, these focal length variations being plotted on the y-axis while the corresponding coefficient $k = 1 - T/F$ is plotted on the x-axis, for each objective system according to the invention.

The curve A corresponds to an objective system according to the invention, the convergent assembly of which is constituted by a divergent lens 2 made of ZnS, cooperating with a convergent assembly 4 made of ZnSe, associated with a divergent assembly constituted by a lens 6 made of germanium. The curve B corresponds to a convergent assembly constituted by a divergent lens 2 made of ZnS cooperating with a convergent lens 4 made of chalcogenide (Amtir) and associated with a divergent lens 6 made of germanium. The curve C corresponds to an objective system constituted by a convergent assembly comprising a divergent lens 2 made of germanium cooperating with a convergent lens 4 made of ZnSe, this assembly being associated with a divergent lens 6 made of ZnS, and the curve D corresponds to an objective system constituted by a convergent assembly comprising a divergent lens 2 made of germanium cooperating with a convergent lens 4 made of chalcogenide, this assembly being associated with a divergent lens 6 made of ZnS.

The characteristics specified in the following table A are the radii of the entrance surface E and exit surface S of the lenses 2, 4 and 6 and the thicknesses of materials that succeed one another on the optical axis for a first embodiment of the objective system as shown in FIG. 1, with the combination of materials corresponding to the curve D of FIG. 3.

TABLE A

| Surface | Radius (mm) | Following Material | Following Thickness |
|---|---|---|---|
| E2 | 135.005 | Germanium | 6.788 |
| S2 | 111.525 | Air | 2.305 |
| E4 | 122.760 | Amtir | 9.738 |
| S4 | 489.371 | Air | 74.509 |
| E6 | 148.851 | ZnS | 6.879 |
| S6 | 85.111 | Air | 208.454 |
| ED | −221.988 | Air (sensor) | |

According to a second embodiment, corresponding to FIG. 2, the arrangements of lenses, sequences and materials are identical to those specified here above, except for the dimensional characteristics which are specified in the table B here below:

TABLE B

| Surface | Radius (mm) | Following Material | Following Thickness |
|---|---|---|---|
| E2 | 148.823 | Germanium | 6.633 |
| S2 | 121.723 | Air | 1.167 |
| E4 | 123.466 | Amtir | 9.748 |
| S4 | 510.679 | Air | 74.442 |
| E6 | 127.786 | ZnS | 6.381 |
| S6 | 76.669 | Air | 206.405 |
| ED | −221.988 | Air (detector) | |

It will be noted that the objective device shown in FIG. 2 is of better quality as it has a conical aspheric surface with $K=0.65640\times10^{-1}$ where K is the coefficient of conicity on the rear face S2 of the divergent front lens made of germanium. It is thus possible to obtain an infrared objective device that has the following paraxial characteristics at ambient temperature: a distance between rear lens and focal plane of 210 mm, an overall length of 100 mm; a focal length of 409 mm, an aperture of F/4.1, a horizontal field of 5.04° and a vertical field of 3.36°.

Figure 4A:
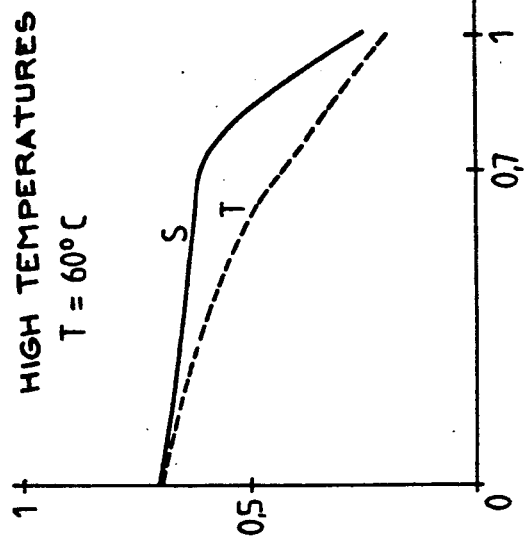
FIGS. 4A, 4B and 4C respectively illustrate the values of the modulation transfer function at the cut-off half-frequency of the detector, for different arrangements of objectives according to the present invention.
Figure 4C:
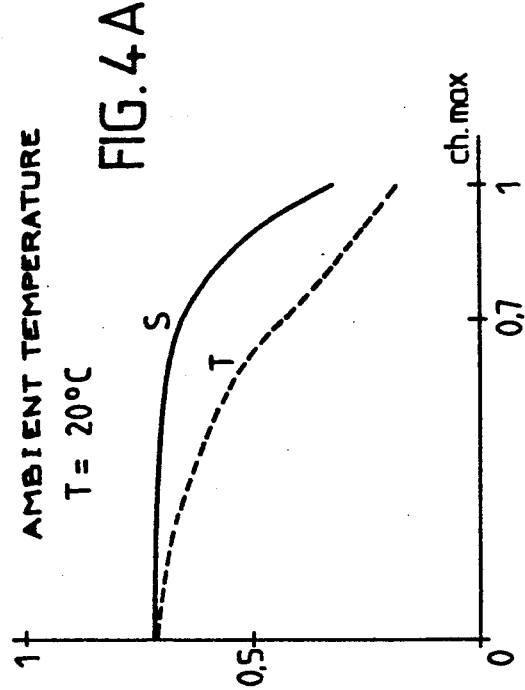
Figure 4B:
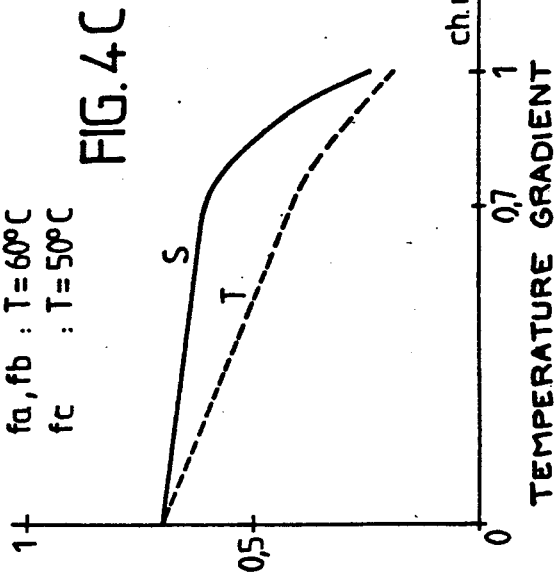

Referring now to FIGS. 4A to 4C, which give the values, for this embodiment, of the modulation transfer function at the cut-off half-frequency of the detector for three different temperatures, FIG. 4A at the ambient temperature 20° C., FIG. 4B at a high temperature of T=60° C. and FIG. 4C where the front assembly is at T=60° C. while the rear lens is at T=50° C., i.e. with a temperature gradient, it is seen that the quality in the field is essentially limited by the apparent longitudinal chromatic aberration. In fact, the chromatic aberration of the assembly, formed by the convergent lens of the front assembly made of chalcogenide and the rear divergent lens made of zinc sulphide, is corrected by the front lens made of germanium, which acts as a port in this telescope objective device.

In the same way, as can be seen in FIGS. 4A to 4C, the front assembly, constituted by the doublet comprising a divergent lens made of germanium and a convergent lens made of chalcogenide is approximately corrected for the thermal drifts. In fact, the power of the divergent lens made of germanium, with high thermal dispersion, has been minimized. It must also be noted that the power of each of the lenses constituting the objective system has been adapted to the expansion coefficient of the supports and spacers. In the embodiment shown in the drawings, all the shims (not shown) are made of aluminium. Furthermore, an objective system such as this is not thermally disturbed since the focusing plane remains fixed if the material should undergo a uniform rise in temperature. Similarly, a linear temperature gradient of 10° C. between the front convergent assembly 2, 4 and the rear divergent assembly 6 (FIG. 4C) has little effect on the quality of the image. The focal lengths fa and fb respectively of the front divergent lens and the front convergent lens have been optimized according to the above-mentioned criteria.

From the foregoing, it is seen that the most appropriate succession to obtain a favorable athermalization is the Ge-chalcogenide-ZnS sequence which corresponds to the curve D of FIG. 1. The relative variations of the field for T=50° C. are respectively 1.6 percent for the embodiment associated with Table A and 1.8 percent for the embodiment associated with Table B.

These very small variations lead to errors in the appreciation of the entrance field angle $\theta$, these errors being of the order of 0.1 mrd at the edge of the diagonal field.

Figure 5:
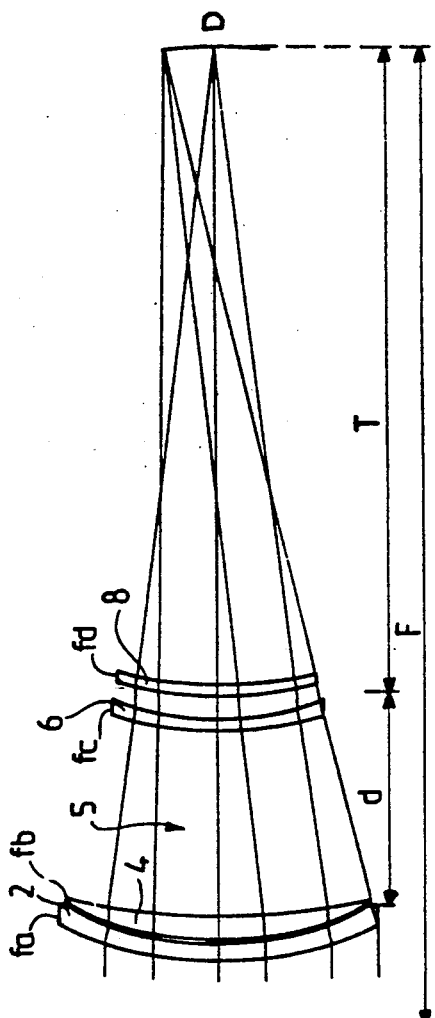
FIG. 5 illustrates another embodiment of athermalized objectives according to the present invention.

This error may be further reduced by having a duplicate rear lens according to an improved embodiment of the objective device as shown in FIG. 5.

This objective has two doublets, namely a first convergent doublet constituted by a divergent lens 2 having a focal length fa and an associated convergent lens 4 having a focal length fb, cooperating with a second divergent doublet constituted by a divergent lens 6 having a focal length fc and a convergent lens 8 having a focal length fd, the distance between two doublets being d for a distance between rear lens and focal plane T and a focal length F of the assembly. The following fundamental relationships govern the four conditions:

Condition of achromatization:

$$\frac{1}{fa \cdot \delta a} + \frac{1}{fb \cdot \delta b} + \frac{(1-k)^2}{fc \cdot \delta c} + \frac{(1-k)^2}{fd \cdot \delta d} = 0 \quad [P_1]$$

Condition of focal length:

$$\frac{1}{fa} + \frac{1}{fb} + \frac{(1-k)}{fc} + \frac{1-k}{fd} = \frac{1}{F} \quad [P_2]$$

Condition of athermalization:

$$\frac{1}{fa}\left(\frac{1}{\eta a} + k\alpha\right) + \frac{1}{fb}\left(\frac{1}{\eta b} + k\alpha\right) + \quad [P_3]$$

$$\frac{(1-k)^2}{fc\eta c} + \frac{(1-k)^2}{fd\eta d} = -\alpha\frac{(1-k)^2}{T}$$

Minimization of the variations in focal length:

$$\frac{1}{fa \cdot \eta a} + \frac{1}{fb \cdot \eta b} + \frac{(1-k)}{fc}\left(\frac{1}{\eta c} + \alpha\right) + \quad [P_4]$$

$$\frac{(1+k)}{fd}\left(\frac{1}{\eta d} + \alpha\right)$$

It must be noted that the expression $P_5$ pertaining to the sensitivity of the optical configuration to the thermal gradients is unchanged.

In one embodiment of this objective system with two doublets, the first doublet is constituted by a divergent lens 2 made of germanium, acting as a port, associated with a second convergent lens 4 made of chalcogenide with a convergence that is sufficient to give an overall convergence to the assembly, this doublet being associated with a second doublet constituted by a divergent lens 6, made of zinc sulphide, associated with a convergent lens 8 made of germanium.

The dimensional characteristics of the different elements of this assembly are specified in the following Table C for an optimized embodiment:

TABLE C

| Surface | Radius (mm) | Following Material | Following Thickness |
|---|---|---|---|
| E2 | 159.738 | Germanium | 6.647 |
| S2 | 128.731 | Air | 2.482 |
| E4 | 133.348 | Amtir | 11.986 |
| S4 | 314.177 | Air | 80.151 |
| E6 | 154.624 | ZnS | 4.477 |
| S6 | 116.223 | Air | 11.414 |
| E8 | 179.968 | ZnS | 5.387 |
| S6 | 200.429 | Air | 279.413 |

TABLE C-continued

| Surface | Radius (mm) | Following Material | Following Thickness |
|---|---|---|---|
| ED | −222.000 | Air | |

*conical surface with K = 0.14877

A telescope objective system is thus obtained, having the following paraxial characteristics at ambient temperature: a distance between rear lens and focal plane of 178 mm, an overall length of 120 mm, a focal length of 420 mm, an aperture of F/4.1, a horizontal field of 5.04° and a vertical field of 3.36°. The presence of the rear doublet comprising a divergent lens made of zinc sulphide and a convergent lens made of germanium means that the lengthwise achromatic aberration, which was not corrected in the embodiments of FIGS. 1 and 2, is slightly attenuated here.

Figure 6A:
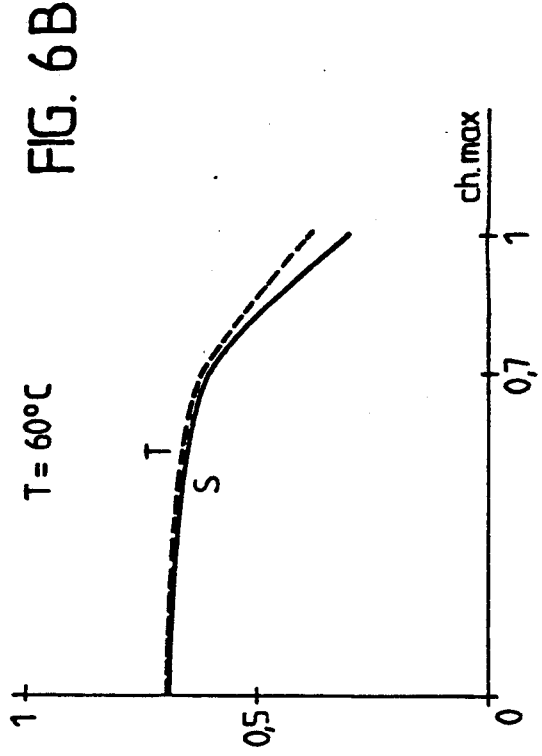
FIGS. 6A, 6B and 6C illustrate the drop in modulation transfer function for the different arrangements of objectives.
Figure 6B:
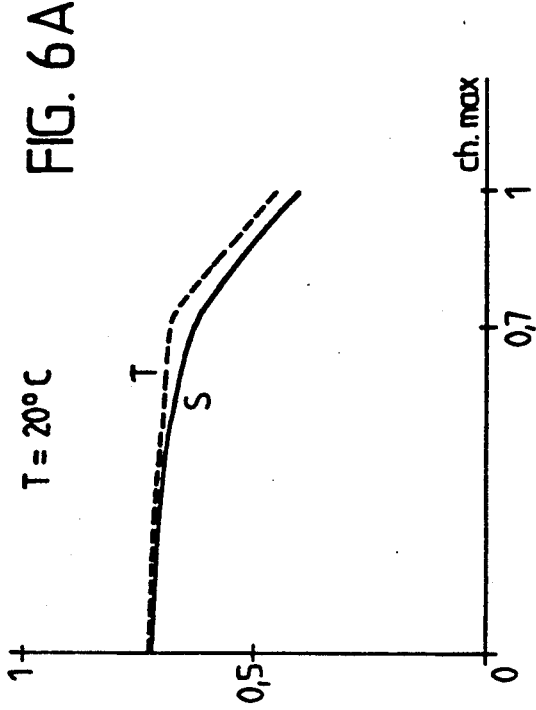
Figure 6C:
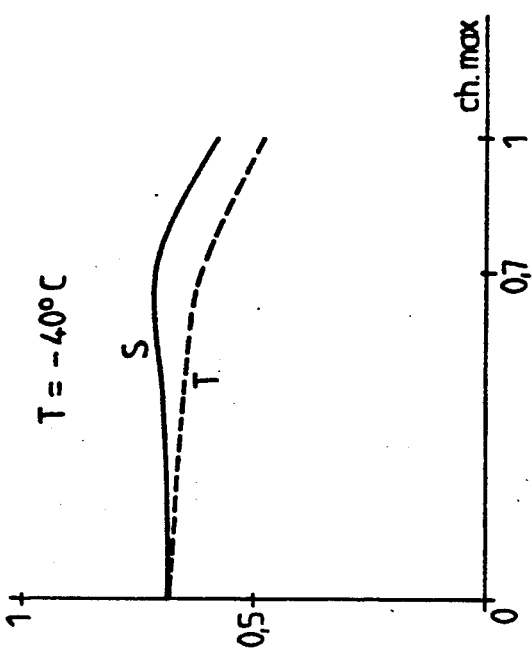

FIGS. 6A to 6C illustrate the modulation transfer function in relation to temperature, for this embodiment, respectively for the temperatures T=20° C., T=60° C. and T=−40° C., and show a diminishing with the temperature, all the spacers being made of aluminium.

In this embodiment, the relative variations of the field, induced by the changes in focal length with the temperature, are reduced by the addition of the rear convergent lens made of germanium.

For T=50° C., these variations go from 1.8 percent for the embodiment corresponding to the table B to 0.7 percent in the latter embodiment, entailing an error of 0.04 mrd in the object field angle at the edge of the diagonal field.

Thus, the present invention resolves the problems raised by the front port of infrared telescope objectives, which is now advantageously replaced by a front lens made of germanium or possibly zinc sulphide, at the same time as it resolves the problem of athermalization and achromatization through the use of three lenses made of different materials, the association of the convergent front doublet and the divergent rear lens making it possible to obtain a telescope objective type of optical configuration. Furthermore, the power values and constituent materials of the front doublet are chosen so as to minimize the defocussing induced by axial thermal gradients. In the same way, the sequence of glasses chosen minimizes the variations in focal length, hence the field variations, with temperature. This enables the use of an optical configuration such as this with a firing control system. According to one improvement, the problem of the variations in focal length and chromatic aberrations is also resolved by setting up a duplicate rear divergent assembly for the telescope objective, thus also enabling the partial correction of the apparent longitudinal chromatic aberration of this type of objective.

What is claimed is:

1. An objective device that is achromatic and passively athermalized, said device comprising:
   at least one convergent assembly cooperating with at least one divergent assembly, said convergent assembly comprising at least one convergent lens and one divergent lens, said divergent assembly being constituted by at least one divergent lens, wherein:
   the constituent materials of said three lenses are different and chosen from among those materials that can be used in the 8 to 12 μm spectral band; and
   a focal length F of the device does not change with temperature if $f_a$, $f_b$ and $f_c$ satisfy the following equation:

$$\frac{1}{f_a \cdot \eta_a} - \frac{1}{f_b \cdot \eta_b} + \frac{(1-k)}{f_c}\left(\frac{1}{\eta_c} + \alpha\right) = 0; \text{ and}$$

a first order defocusing ε for a passively athermalized objective undergoing a temperature gradient is expressed as follows:

$$\epsilon = \frac{T^2}{(1-k)^2}(dt_2 - dt_1)\left[\frac{1}{f_a \cdot \eta_a} + \frac{1}{f_b \cdot \eta_b} + \frac{k\alpha}{2}\left(\frac{1}{f_a} + \frac{1}{f_b}\right)\right]$$

wherein:
   $f_a$ is the focal length of the at least one divergent lens of the convergent assembly;
   $f_b$ is the focal length of the at least one convergent lens of the convergent assembly;
   $f_c$ is the focal length of the at least one divergent lens of the divergent assembly;
   $\eta_a$, $\eta_b$ and $\eta_c$ correspond to thermal Abbe pseudo-numbers defined for the divergent and convergent lenses of the convergent assembly and the divergent lens of the divergent assembly;
   $\alpha$ is the expansion coefficient for a support; and
   $dt_1$, $dt_2$ are respective temperature variations of the convergent assembly and the divergent assembly.

2. The device according to claim 1, wherein:
   the divergent lens of said convergent assembly is made of a material chosen from among germanium and zinc sulphide and the convergent lens of the convergent assembly is made of chalcogenide, the divergent assembly being constituted by a simple divergent lens.

3. The device according to claim 2, having the following characteristics:
   the divergent lens of said convergent assembly is made of germanium with a thickness of 6.788 mm on the axis, the radii of entrance and exit surfaces of the divergent lens of said convergent assembly being respectively 135.005 and 111.525 mm;
   air thickness of 2.305 mm;
   the convergent lens of said convergent assembly made of chalcogenide has a thickness of 9.738 mm on the axis, the radii of entrance and exit surfaces of said convergent lens being respectively 122.760 and 489.371 mm;
   an air thickness between the convergent assembly and the divergent lens of 74.509 mm;
   divergent lens made of zinc sulphide with a thickness of 6.879 mm on the axis, the radii of the entrance and exit surfaces of this lens being respectively 148.851 and 85.111 mm; and
   the focal length being at a distance on the axis of 208.454 mm and the radius of curvature of the corresponding surface being −221.998 mm.

4. The device according to claim 2, having the following characteristics:
   the divergent lens of said convergent assembly is made of germanium with a thickness of 6.633 mm on the axis, the radii of entrance and exit surfaces of this lens being respectively 148.823 and 121.723 mm;

air thickness of 1.167 mm;

convergent lens made of chalcogenide with a thickness of 9.748 mm on the axis, the radii of entrance and exit surfaces of this lens being respectively 123.466 and 510.679 mm;

an air thickness between the convergent assembly and the divergent lens of 74.442 mm;

divergent lens made of zinc sulphide with a thickness of 6.381 mm on the axis, the radii of the entrance and exit surfaces of this lens being respectively 127.851 and 76.669 mm;

the focal length being at a distance on the axis of 206.405 mm and the radius of curvature of the corresponding surface being $-221.988$ mm; and the exit surface of the divergent lens being a conical aspheric surface with $K=0.65640\times10^{-1}$, where K is the coefficient of conicity.

5. The device according to claim 2, wherein the lens arrangement and the materials constituting the lenses minimize thermal drifts of the focal length of the device for keeping a sharp image without any mechanical shifting of the lens while, at the same time, keeping the object field of view fixed when the temperature of the assembly changes.

6. The device according to claim 5, wherein the lenses have power values and a sequence of constituent materials which minimize the defocussings induced by an axial temperature gradient between the front convergent assembly and the rear divergent assembly.

7. The device according to claim 6, wherein the front lens of the convergent assembly is a front port and is made of a material having physical characteristics of resistance to chemicals and atmospheric influences.

8. The device according to claim 1, wherein:
the divergent lens of said convergent assembly is made of a material chosen from among germanium and zinc sulphide and the convergent lens of the convergent assembly is made of chalcogenide; and
the divergent assembly comprises said at least one divergent lens and a convergent lens, one of said divergent lens and said convergent lens of said divergent assembly being made of zinc sulphide and the other being made of germanium.

9. The device according to claim 8, having the following characteristics:
the divergent lens of said convergent assembly is made of germanium with a thickness of 6.647 mm on the axis, the radii of entrance and exit surfaces of this lens being respectively 159.738 and 128.731 mm;

air thickness of 2.482 mm;

convergent lens made of chalcogenide with a thickness of 11.986 mm on the axis, the radii of entrance and exit surfaces of this lens being respectively 133.348 and 314.177 mm;

air thickness between the convergent assembly and the divergent lens of 80.151 mm;

divergent lens made of zinc sulphide with a thickness of 4.477 mm on the axis, the radii of the entrance and exit surfaces of this lens being respectively 154.624 and 116.414 mm;

convergent lens made of germanium with a thickness of 5.387 on the axis, the radii of entrance and exit surfaces of this lens being respectively 179.968 mm and 200.429 mm, the exit surface being a conical surface with $K=0.14877$; and the focal length being at a distance on the axis of 279.413 mm and the radius of curvature of the corresponding surface being $-222.00$ mm.

10. The device according to claim 8, herein the lens arrangement and the materials constituting the lenses minimize thermal drifts of the focal length of the device for keeping a sharp image without any mechanical shifting of the lens while, at the same time, keeping the object field of view fixed when the temperature of the assembly changes.

11. The device according to claim 10, wherein the lenses have power values and a sequence of constituent materials which minimize the defocussings induced by an axial temperature gradient between the front convergent assembly and the rear divergent assembly.

12. The device according to claim 11, wherein the front lens of the convergent assembly is a front port and is made of a material having physical characteristics of resistance to chemicals and atmospheric influences.

* * * * *